(12) United States Patent
Aluru et al.

(10) Patent No.: US 12,726,719 B2
(45) Date of Patent: Sep. 1, 2026

(54) REDUCED BLOOMING AROUND LIGHT SOURCES

(71) Applicant: GM GLOBAL TECHNOLOGY OPERATIONS LLC, Detroit, MI (US)

(72) Inventors: Sai Vishnu Aluru, Commerce Township, MI (US); Colton Warner, Knoxville, TN (US); Aaron Yurcisin, Deltona, FL (US); Craig T. Douglas, Pflugerville, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 18/829,559

(22) Filed: Sep. 10, 2024

(65) Prior Publication Data

US 2026/0075324 A1 Mar. 12, 2026

(51) Int. Cl.

*H04N 23/76* (2023.01)
*B60R 11/04* (2006.01)
*G06T 5/70* (2024.01)
*G06T 7/13* (2017.01)
*H04N 23/71* (2023.01)
*H04N 25/621* (2023.01)

(52) U.S. Cl.

CPC ............... *H04N 23/76* (2023.01); *G06T 5/70* (2024.01); *G06T 7/13* (2017.01); *H04N 23/71* (2023.01); *G06T 2207/30168* (2013.01); *G06T 2207/30252* (2013.01); *H04N 25/621* (2023.01)

(58) Field of Classification Search

CPC ........ H04N 23/70; H04N 23/71; H04N 23/76; H04N 23/82; H04N 25/61; B60R 11/04

USPC ........................................................ 348/221.1

See application file for complete search history.

(56) References Cited

U.S. PATENT DOCUMENTS

2005/0275737 A1* 12/2005 Cheng .................... H04N 23/63 348/333.02
2020/0162642 A1* 5/2020 Oniki ..................... H04N 23/90
2021/0293932 A1* 9/2021 Bruce-Wen ........... G01S 7/4813
2022/0327666 A1* 10/2022 Ollila ..................... H04N 25/61

(Continued)

FOREIGN PATENT DOCUMENTS

KR 101327035 B1 * 11/2013 ............... G06T 7/44
KR 102365430 B1 * 2/2022 ........... G07C 5/0866

OTHER PUBLICATIONS

Schettini, Gasparini, Corchs, Marini; Contrast image correction method. Journal of Electronic Imaging, 2010, 19. Jg., Nr. 2, S. 023005-023005-11. https://doi.org/10.1117/1.3386681.

*Primary Examiner* — Anthony J Daniels
(74) *Attorney, Agent, or Firm* — Quinn IP Law

(57) ABSTRACT

A system includes a camera, an electronic control unit, and a visual display. The camera is operational to acquire an acquired frame of an environment external to the system. The acquired frame has a plurality of pixels. The electronic control unit is coupled to the camera and is operational to detect one or more light sources in the acquired frame, determine a first number of a plurality of blooming pixels around the one or more light sources among the plurality of pixels, and generate a processed frame by modifying a plurality of contrast curves of the plurality of pixels to reduce the plurality of blooming pixels around the one or more light sources. The visual display is coupled to the electronic control unit and is operational to display the processed frame.

20 Claims, 3 Drawing Sheets

(56) References Cited

U.S. PATENT DOCUMENTS

2023/0129320 A1* 4/2023 Wu ........................ H04N 25/50
250/201.1

* cited by examiner

REDUCED BLOOMING AROUND LIGHT SOURCES

INTRODUCTION

The present disclosure relates to a system and a method for reduced blooming around light sources.

Approaching automobile headlights, sunlight, and other bright objects cause an adverse effect of 'light blooming' on user displays. The adverse effects generally include nuisance visual elements, light pollution reduction that obstruct the user view, unclear landscapes, and eye strain.

Accordingly, those skilled in the art continue with research and development efforts in the field of reducing the blooming seen around light sources acquired by a camera.

SUMMARY

A system is provided herein. The system includes a camera, an electronic control unit, and a visual display. The camera is operational to acquire an acquired frame of an environment external to the system. The acquired frame has a plurality of pixels. The electronic control unit is coupled to the camera and is operational to detect one or more light sources in the acquired frame, determine a first number of a plurality of blooming pixels around the one or more light sources among the plurality of pixels, and generate a processed frame by modifying a plurality of contrast curves of the plurality of pixels to reduce the plurality of blooming pixels around the one or more light sources. The visual display is coupled to the electronic control unit and is operational to display the processed frame.

In one or more embodiments of the system, the camera is further operational to acquire the plurality of contrast curves in the acquired frame, and transfer the plurality of contrast curves to the electronic control unit.

In one or more embodiments of the system, the camera is further operational to calculate a first number of a plurality of edges in the acquired frame, and transfer the first number of the plurality of edges to the electronic control unit.

In one or more embodiments of the system, the electronic control unit is further operational to modify the plurality of contrast curves in response to the first number of the plurality of edges exceeding an edge threshold.

In one or more embodiments of the system, the electronic control unit is further operational to calculate a second number of the plurality of edges in the processed frame.

In one or more embodiments of the system, the electronic control unit is further operational to further modify the plurality of contrast curves in response to the second number of the plurality of edges exceeding the edge threshold.

In one or more embodiments of the system, the electronic control unit is further operational to determine a second number of the plurality of blooming pixels in the processed frame.

In one or more embodiments of the system, the electronic control unit is further operational to further modify the plurality of contrast curves in response to the second number of the plurality of blooming pixels exceeding a blooming threshold.

In one or more embodiments, the system a transmitter coupled to the electronic control unit and operational to transmit the processed frame to a back office, wherein the back office is external to the system.

In one or more embodiments, the system includes <a perception circuit operational to consume the processed frame.

A method for reduced blooming around light sources is provided herein. The method includes acquiring an acquired frame of an environment external to a vehicle with a camera. The acquired frame has a plurality of pixels. The method includes detecting one or more light sources in the acquired frame with an electronic control unit, determining a first number of a plurality of blooming pixels around the one or more light sources among the plurality of pixels with the electronic control unit, generating a processed frame by modifying a plurality of contrast curves of the plurality of pixels with the electronic control unit to reduce the plurality of blooming pixels around the one or more light sources, and displaying the processed frame on a visual display.

In one or more embodiments, the method includes acquiring the plurality of contrast curves in the acquired frame with the camera, and transferring the plurality of contrast curves from the camera to the electronic control unit.

In one or more embodiments, the method includes calculating a first number of a plurality of edges in the acquired frame with the camera, and transferring the first number of the plurality of edges from the camera to the electronic control unit.

In one or more embodiments, the method includes modifying the plurality of contrast curves with the electronic control unit in response to the first number of the plurality of edges exceeding an edge threshold.

In one or more embodiments, the method includes calculating a second number of the plurality of edges in the processed frame with the electronic control unit.

In one or more embodiments, the method includes modifying further the plurality of contrast curves with the electronic control unit in response to the second number of the plurality of edges exceeding the edge threshold.

In one or more embodiments, the method includes determining a second number of the plurality of blooming pixels in the processed frame with the electronic control unit.

In one or more embodiments, the method includes modifying further the plurality of contrast curves with the electronic control unit in response to the second number of the plurality of blooming pixels exceeding a blooming threshold.

In one or more embodiments, the method includes transmitting the processed frame from a transmitter to a back office, wherein the back office is external to the vehicle.

A vehicle is provided herein. The vehicle includes a camera, an electronic control unit, a visual display, and a transmitter. The camera is operational to acquire an acquired frame of an environment external to the vehicle. The acquired frame has a plurality of pixels. The electronic control unit is coupled to the camera and is operational to detect one or more light sources in the acquired frame, determine a first number of a plurality of blooming pixels around the one or more light sources among the plurality of pixels, and generate a processed frame by modifying a plurality of contrast curves of the plurality of pixels to reduce the plurality of blooming pixels around the one or more light sources. The visual display is coupled to the electronic control unit and is operational to display the processed frame. The transmitter is coupled to the electronic control unit and is operational to transmit the processed frame to a back office, wherein the back office is external to the vehicle.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and/or method to minimize radiometric circular starburst effects from camera imagery while looking at bright lights. The technique detects each light source in the camera images and measures a radius from center of the light source. After measurement, contrast curves and/or edge counts of the image are modified to reduce the blooming while clarity is retained. The technique generally reduces adverse effects of 'light blooming' from the sun, external headlights, and other bright objects. The technique provides users with enhanced visibility via the removal of nuisance visual elements caused by the light blooming.

Figure 1:
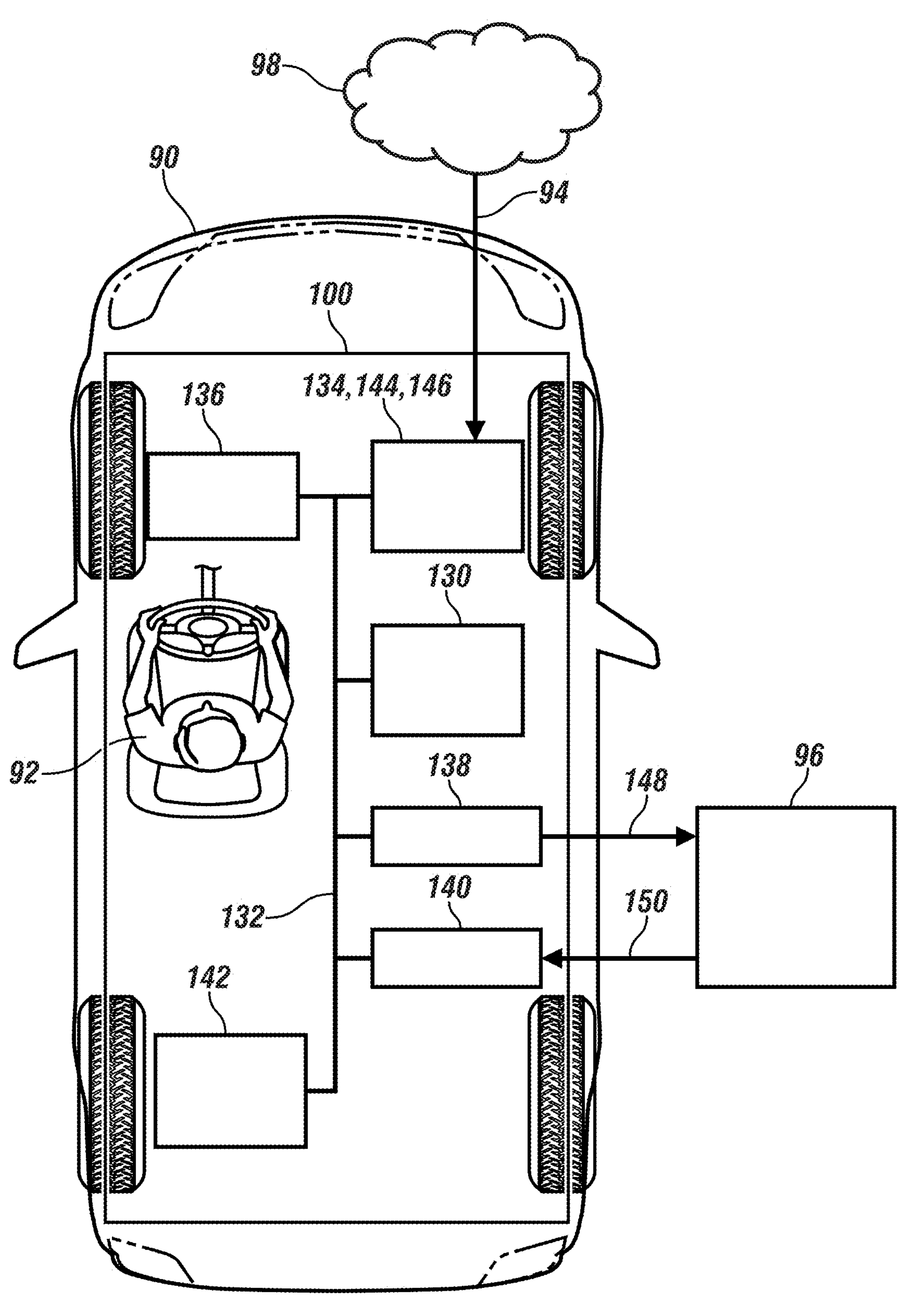
FIG. 1 is a schematic plan diagram of a vehicle in accordance with one or more exemplary embodiments.

Referring to FIG. 1, a schematic plan diagram of a vehicle 90 is shown in accordance with one or more exemplary embodiments. The vehicle 90 generally includes an electronic control unit 130, a communication bus 132, a camera 134, a visual display 136, a transmitter 138, a receiver 140, and a perception circuit 142. The vehicle 90 may accommodate a driver 92. Bright lights 94 may be received by the camera 134 from an environment 98 external to and around the vehicle 90. One or more of the bright lights 94 may have sufficient intensity to cause blooming among multiple pixels 144 in the camera 134. The vehicle 90 may be in wireless communication with a back office 96.

The electronic control unit 130 implements one or more processing circuits. The electronic control unit 130 is operational to receive an acquired frame from the camera 134, detect one or more bright lights (or light sources) 94 in the acquired frame, determine a first number of blooming pixels 146 around the one or more light sources 94 among the pixels 144, and generate a processed frame 148 by modifying contrast curves of the pixels 144 to reduce the plurality of blooming pixels 146 around the one or more light sources 94. The processed frame 148 may be transferred to the visual display 136 for presentation to the driver 92. The processed frame 148 may also be presented to the perception circuit 142 for subsequent utilization. The processed frame 148 may also be transmitted via the transmitter 138 to a back office 96. Information 150 generated by the back office 96 may be received by the receiver 140.

In various embodiments, the electronic control unit 130 generally includes at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, non-transitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components and communicate instructions to the other electronic components.

The communication bus 132 implements a multi-node, bidirectional digital bus. The communication bus 132 is operational to exchange data among the electronic control unit 130, the camera 134, the visual display 136, the transmitter 138, the receiver 140, and the perception circuit 142.

The camera 134 implements a forward-looking camera sensor. In various embodiments, the camera 134 is rigidly mounted at or near a forward end of the vehicle 90. In addition to the forward-looking camera 134, the vehicle 90 may have other cameras installed, such as left-side cameras, right-side cameras, rear cameras, etc. The camera 134 and/or the other cameras may be installed at other positions of the vehicle 90 to cover other fields of view of the environment 98. The camera 134 is operational to capture a sequence of images of the environment 98 around (e.g., ahead) of the vehicle 90. The camera 134 may be an optical camera that works in a visible spectrum and/or in a near infrared spectrum. In some embodiments, the camera 134 may include a high-speed shutter to limit blurring in the images due to movement of the vehicle 90. In various embodiments, the images may be reported on the communication bus 132. In other embodiments, the images may be transferred to the electronic control unit 130 and/or the perception circuit 142 via dedicated links.

The visual display 136 implements two-dimensional display viewable by the driver 92. The visual display 136 may be a cluster display positioned directly in front of the driver 92. The visual display 136 may be a console display positioned for use by the driver 92 and a passenger.

The transmitter 138 is operational to transmit processed frames 148 to the back office 96. The processed frames 148 are received at the transmitter 138 via the communication bus 132.

The receiver 140 is operational to receive the information 150 from the back office 96. The information 150 is transferred to the electronic control unit 130 and/or the perception circuit 142 via the communication bus 132.

The perception circuit 142 implements digital circuitry. The perception circuit 142 is operational to perform a variety of operations on the acquired images and/or processed frames 148. For example, the perception circuit 142 may mimic the functioning of the human visual system, enabling machines to perceive and understand visual data. The perception circuit 142 typically includes multiple interconnected components, such as sensors, filters, amplifiers, and processors. The perception circuit 142 receives input from image sensors, that capture visual data and convert the visual data into electrical signals. The electrical signals are then processed through various stages of the perception circuit 142, including filtering to enhance specific features or remove noise, amplification to strengthen the signals, and segmentation to identify different objects or regions within the image. The perception circuit 142 also incorporates algorithms and computational models to analyze and interpret the visual information. The analysis and interpretation may involve tasks such as object recognition, motion detection, depth perception, and scene understanding. The processed data is then used for various applications, such as autonomous navigation, object tracking, surveillance systems, and image-based decision-making. The perception circuit 142 plays a role that enables machines to perceive and make sense of visual information, bridging the gap between the physical world and digital systems, and provides a component in the development of computer vision and artificial intelligence systems. Other use cases may be implemented by the perception circuit 142 to meet the design criteria of a particular application.

Figure 2:
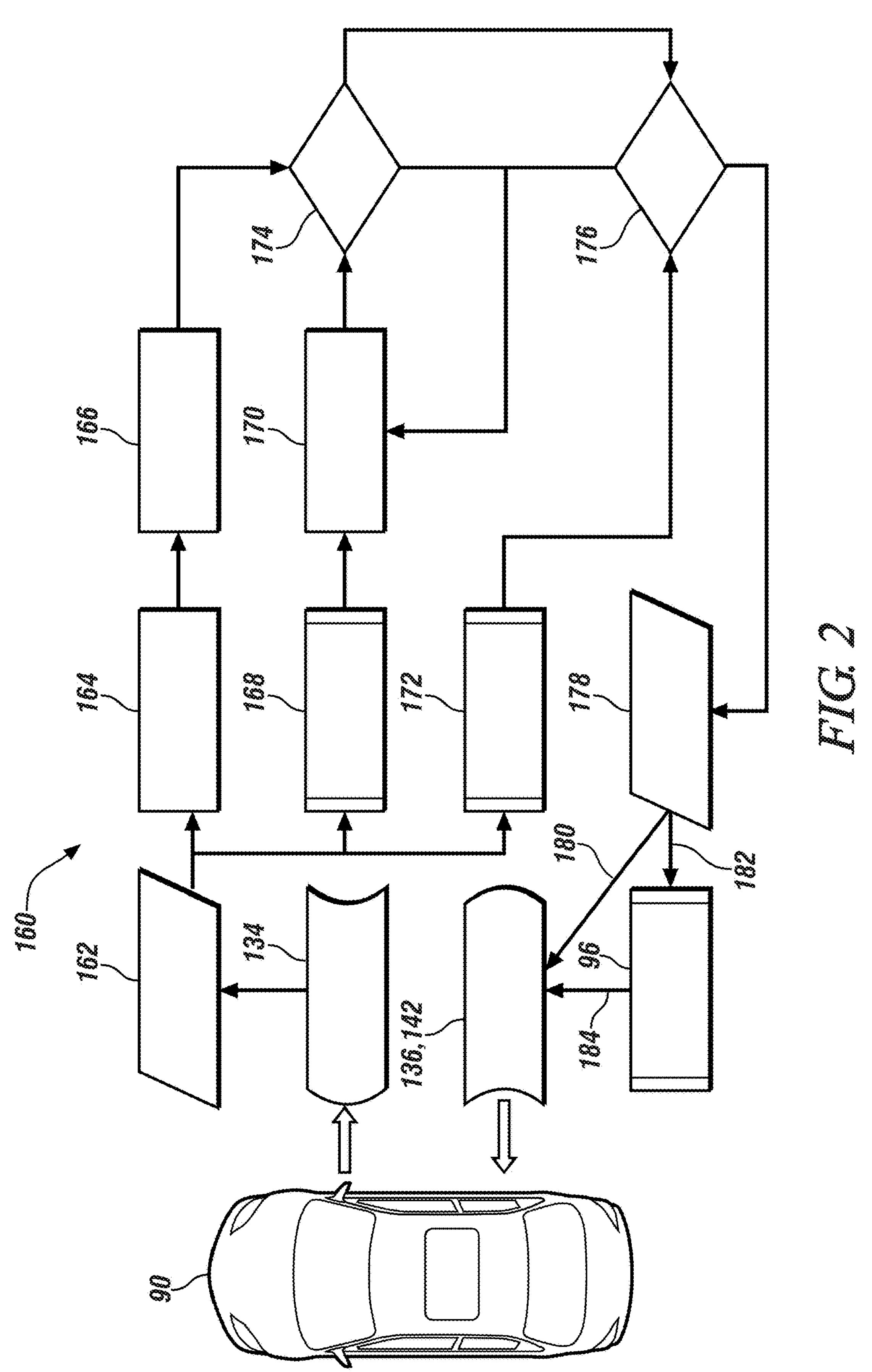
FIG. 2 is a flow diagram of a technique for reducing blooming around light sources in accordance with one or more exemplary embodiments.

Referring to FIG. 2 with references back to FIG. 1, a flow diagram of an example technique for reducing blooming around light sources is shown in accordance with one or more exemplary embodiments. The technique 160 (or method or process) may be implemented by the system 100 (FIG. 1). The technique 160 generally includes the step 162 to 184, as illustrated. The sequence of steps is shown as a representative example. Other step orders may be implemented to meet the criteria of a particular application.

In the step 162, the camera 134 may capture an acquired frame. The frame generally has a two-dimensional matrix of pixels. The acquired frame is presented to the steps 164, 168, and 172.

In the step 164, one or more light sources 94 in the acquired frame may be detected by the electronic control unit 130. The electronic control unit 130 may determine the first number of blooming pixels 146 around the one or more light sources 94 among the pixels 144 in the step 166. The first number of blooming pixels 146 is presented to the step 174.

In the step 168, the camera 134 acquires contrast curves in the acquired frame, and transfers the contrast curves to the electronic control unit 130. The electronic control unit 130 generates an intermediate processed frame by modifying the contrast curves received from the camera 134. The modification of the contrast curves generally reduces the number of blooming pixels 146 around the one or more light sources 94. The number of blooming pixels 146 remaining in the intermediate processed frame is presented to the step 174.

In the step 172, a clarity of the acquired image is determined by the camera 134 by calculating a first number of edges in the acquired frame, and subsequently transferring the number of edges to the electronic control unit 130. The electronic control unit 130 may determine if the number of blooming pixels 146 in the intermediate processed frame exceeds a blooming threshold. If not, the technique 160 returns to the step 170 to further modify the contrast curves. If an acceptable number of blooming pixels 146 remain in the intermediate processed frame, the step 174 moves to the step 176.

In the step 176, the electronic control unit 130 calculates a second number of the edges in the intermediate processed frame. If the number of edges in the intermediate processed frame exceeds an edge threshold, the step 176 returns to the step 170. Therefore, the step 170 further modifies the contrast curves, the number of blooming pixels 146 is checked again in the step 174, and the technique 160 returns o the step 176. Once the number of edges in the intermediate processed frame are below the edge threshold, the intermediate processed frame is considered a final processed frame 178.

In the step 180, the final processed frame 178 is presented to the visual display 136 and/or the perception circuit 142. In the step 182 the final processed frame 178 is presented to the transmitter 138 for transmission to the back office 96. Where the back office 96 has additional information for the vehicle 90, the vehicle 90 may receive the information 150 from the back office 96 in the step 184.

Figure 3:
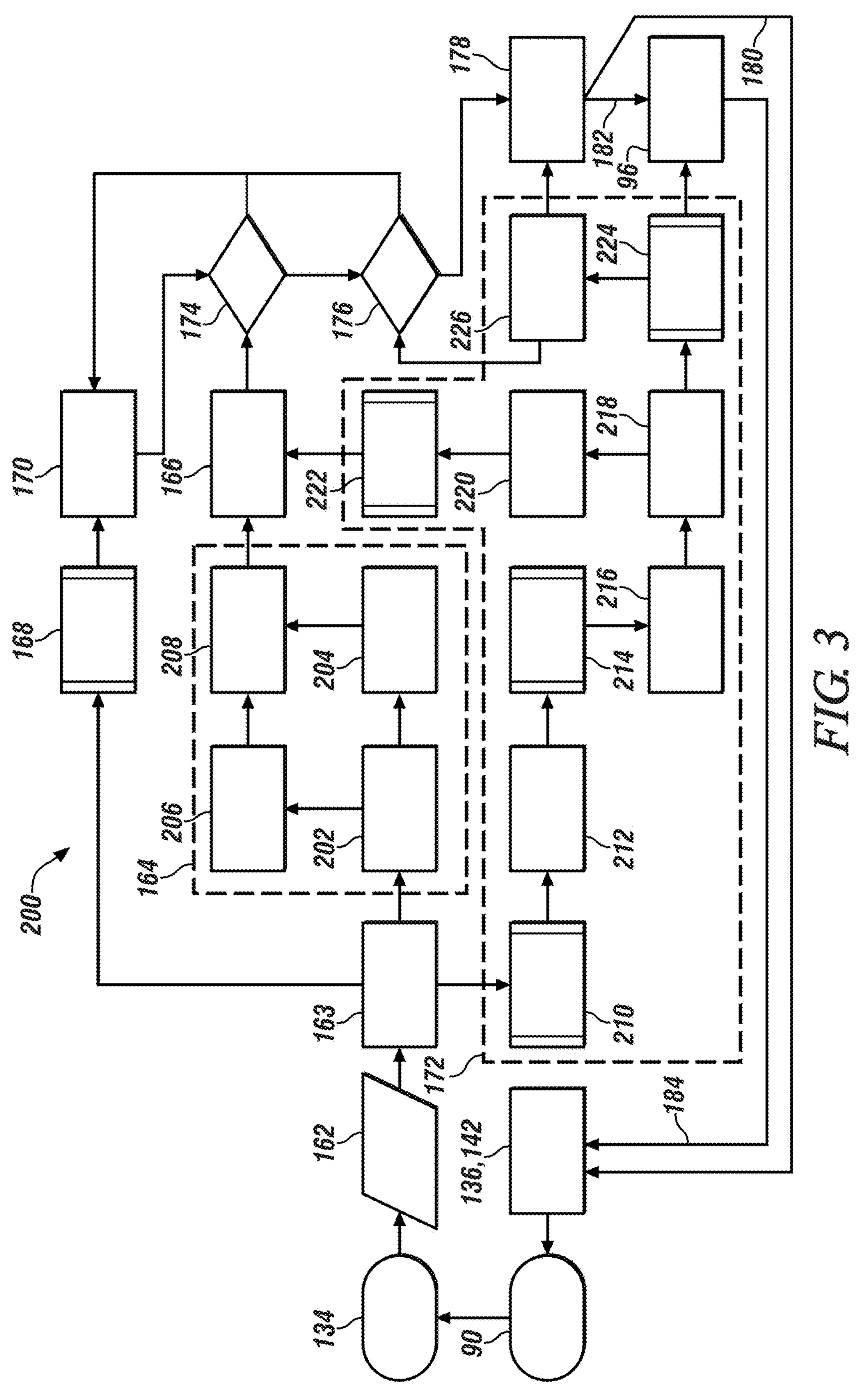
FIG. 3 is a detailed flow diagram of the technique in accordance with one or more exemplary embodiments.

Referring to FIG. 3 with references back to FIGS. 1 and 2, a detailed flow diagram of the technique 200 is shown in accordance with one or more exemplary embodiments. The technique 200 (or method or process) may be implemented by the system 100 (FIG. 1). The technique 200 generally includes the step 162 to 226, as illustrated. The steps 162 to 184 in the technique 200 may be the same as in the technique 160. The sequence of steps is shown as a representative example. Other step orders may be implemented to meet the criteria of a particular application.

In the step 162, the camera 134 may capture an acquired frame. The camera 134 may convert the acquired frame to monochrome in the step 163. The monochrome frame is presented from the step 163 to the steps 164, 168, and 172.

The step 164 generally includes steps 202 to 208, as illustrated. The step 202 may read an average luminance in the monochrome frame. A bit-plane slicing is performed in the step 204. A grey plane slicing is performed in the step 206. Grey levels may be read from the slices in the step 208. The resulting information is presented to the step 166 to calculate the number of blooming pixels 146.

The step 168 and the step 170 are the same as in the technique 160. The modified contrast curves are presented to the step 174 to compare the number of blooming pixels 146 with the blooming threshold.

The step 172 generally includes steps 210 to 226, as illustrated. In the step 210, the camera 134 may find edges in the monochrome frame. Holes and lines in the edges are identified in the step 212. The holes in the lines are filled by the camera 134 in the step 214.

In the step 216, a centroid of the hole may be found. In the step 218, a sample of pixels that is twice the radius of the holes is determined. Luminance values of the pixels in the sample area are read in the step 220. The luminance values are stored as gradients in the step 222. The gradients are presented to the step 166 to calculate the number of blooming pixels 146.

The steps 174 to 184 are the same as in the technique 160. The final processed frame 178 may be transmitted to the back office 96, presented to the visual display 136 and/or presented to the perception circuit 142.

In the step 224, the camera finds edges inside the sample areas around the holes. A number of edges are determined in the step 226. The number of edges are presented to the step 176 to compare the number with the edge threshold.

The system and/or method describe a technique to utilize a cameras by using a real-time post processing approach that reduces radiometric circular starburst effects of bright lights in camera's field of view. The technique reduces the on-screen blooming effect of lights without degrading image quality and retaining clarity, with a goal of providing a distraction free environment to drivers. In effect, some direct benefits of light pollution reduction for users include, but are not limited to, visibility is less obstructed and thus allows a user to focus on other elements within the vicinity, users are able to enjoy a more clear and comprehensive landscape, and the technique helps to reduce risks of prolonged eye strain.

Embodiments of the disclosure generally provide a system that includes a camera, an electronic control unit, and a visual display. The camera is operational to acquire an acquired frame of an environment external to the system. The acquired frame has multiple pixels. The electronic control unit is coupled to the camera. The electronic control unit is operational to detect one or more light sources in the acquired frame, determine a first number of a plurality of blooming pixels around the one or more light sources among the plurality of pixels, and generate a processed frame by modifying a plurality of contrast curves of the plurality of pixels to reduce the plurality of blooming pixels around the one or more light sources. The visual display is coupled to the electronic control unit. The visual display is operational to display the processed frame.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:
- a camera operational to acquire an acquired frame of an environment external to the system and calculate a first number of a plurality of edges in the acquired frame, wherein the acquired frame has a plurality of pixels;
- an electronic control unit coupled to the camera and operational to:
  - detect one or more light sources in the acquired frame;
  - determine a first number of a plurality of blooming pixels around the one or more light sources among the plurality of pixels;
  - calculate a second number of the plurality of edges; and
  - generate a processed frame by modifying a plurality of contrast curves of the plurality of pixels in response to the first number of the plurality of edges and the second number of the plurality of edges to reduce the plurality of blooming pixels around the one or more light sources; and
- a visual display coupled to the electronic control unit and operational to display the processed frame.

2. The system according to claim 1, wherein the camera is further operational to:
- acquire the plurality of contrast curves in the acquired frame; and
- transfer the plurality of contrast curves to the electronic control unit.

3. The system according to claim 1, wherein the camera is further operational to:
- transfer the first number of the plurality of edges to the electronic control unit.

4. The system according to claim 1, wherein the electronic control unit is further operational to:
- modify the plurality of contrast curves in response to the first number of the plurality of edges exceeding an edge threshold.

5. The system according to claim 4, wherein the electronic control unit is further operational to:
- further modify the plurality of contrast curves in response to the second number of the plurality of edges exceeding the edge threshold.

6. The system according to claim 1, wherein the electronic control unit is further operational to:
- determine a second number of the plurality of blooming pixels in the processed frame.

7. The system according to claim 6, wherein the electronic control unit is further operational to:
- further modify the plurality of contrast curves in response to the second number of the plurality of blooming pixels exceeding a blooming threshold.

8. The system according to claim 1, further comprising:
- a transmitter coupled to the electronic control unit and operational to transmit the processed frame to a back office, wherein the back office is external to the system.

9. The system according to claim 1, further comprising:
- a perception circuit operational to consume the processed frame.

10. A method for reduced blooming around light sources comprising:
- acquiring an acquired frame of an environment external to a vehicle with a camera, wherein the acquired frame has a plurality of pixels;
- calculating a first number of a plurality of edges in the acquired frame with the camera;
- detecting one or more light sources in the acquired frame with an electronic control unit;
- determining a first number of a plurality of blooming pixels around the one or more light sources among the plurality of pixels with the electronic control unit;
- calculating a second number of the plurality of edges with the electronic control unit;
- generating a processed frame by modifying a plurality of contrast curves of the plurality of pixels with the electronic control unit in response to the first number of the plurality of edges and the second number of the plurality of edges to reduce the plurality of blooming pixels around the one or more light sources; and
- displaying the processed frame on a visual display.

11. The method according to claim 10, further comprising:
- acquiring the plurality of contrast curves in the acquired frame with the camera; and
- transferring the plurality of contrast curves from the camera to the electronic control unit.

12. The method according to claim 10, further comprising:
- transferring the first number of the plurality of edges from the camera to the electronic control unit.

13. The method according to claim 10, further comprising:
- modifying the plurality of contrast curves with the electronic control unit in response to the first number of the plurality of edges exceeding an edge threshold.

14. The method according to claim 13, further comprising:
- modifying further the plurality of contrast curves with the electronic control unit in response to the second number of the plurality of edges exceeding the edge threshold.

15. The method according to claim 10, further comprising:

determining a second number of the plurality of blooming pixels in the processed frame with the electronic control unit.

16. The method according to claim 15, further comprising:

modifying further the plurality of contrast curves with the electronic control unit in response to the second number of the plurality of blooming pixels exceeding a blooming threshold.

17. The method according to claim 10, further comprising:

transmitting the processed frame from a transmitter to a back office, wherein the back office is external to the vehicle.

18. A vehicle comprising:

a camera operational to acquire an acquired frame of an environment external to the vehicle and calculate a first number of a plurality of edges in the acquired frame, wherein the acquired frame has a plurality of pixels;

an electronic control unit coupled to the camera and operational to:

detect one or more light sources in the acquired frame;

determine a first number of a plurality of blooming pixels around the one or more light sources among the plurality of pixels;

calculate a second number of the plurality of edges, and generate a processed frame by modifying a plurality of contrast curves of the plurality of pixels in response to the first number of the plurality of edges and the second number of the plurality of edges to reduce the plurality of blooming pixels around the one or more light sources;

a visual display coupled to the electronic control unit and operational to display the processed frame; and a transmitter coupled to the electronic control unit and operational to transmit the processed frame to a back office, wherein the back office is external to the vehicle.

19. The vehicle according to claim 18, wherein the camera is further operational to:

acquire the plurality of contrast curves in the acquired frame; and transfer the plurality of contrast curves to the electronic control unit.

20. The vehicle according to claim 19, wherein the electronic control unit is further operational to:

modify the plurality of contrast curves in response to the first number of the plurality of edges exceeding an edge threshold; and further modify the plurality of contrast curves in response to the second number of the plurality of edges exceeding the edge threshold.

* * * * *